INVENTOR.
Dominic R. Rodeghiero
BY
Attorney

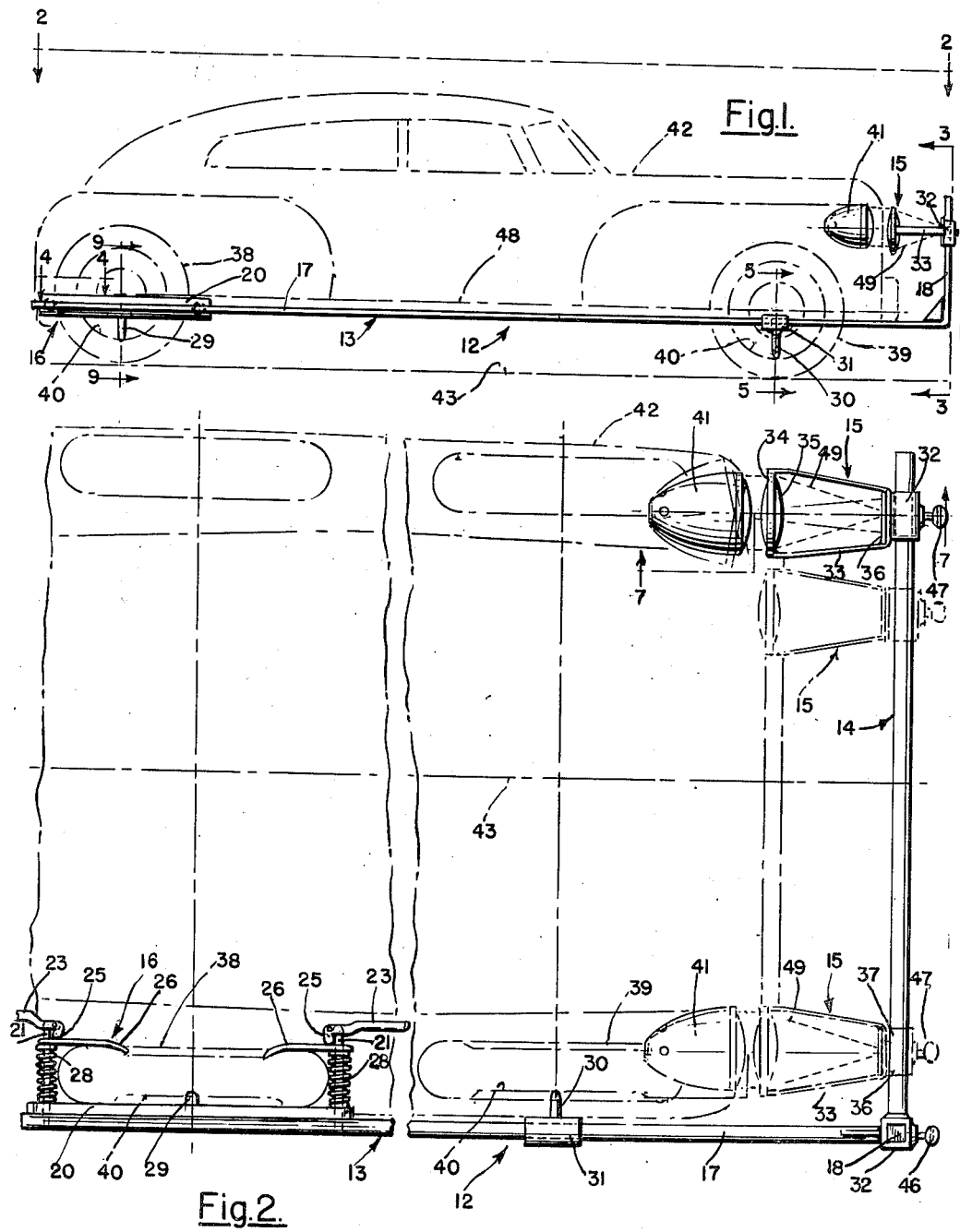

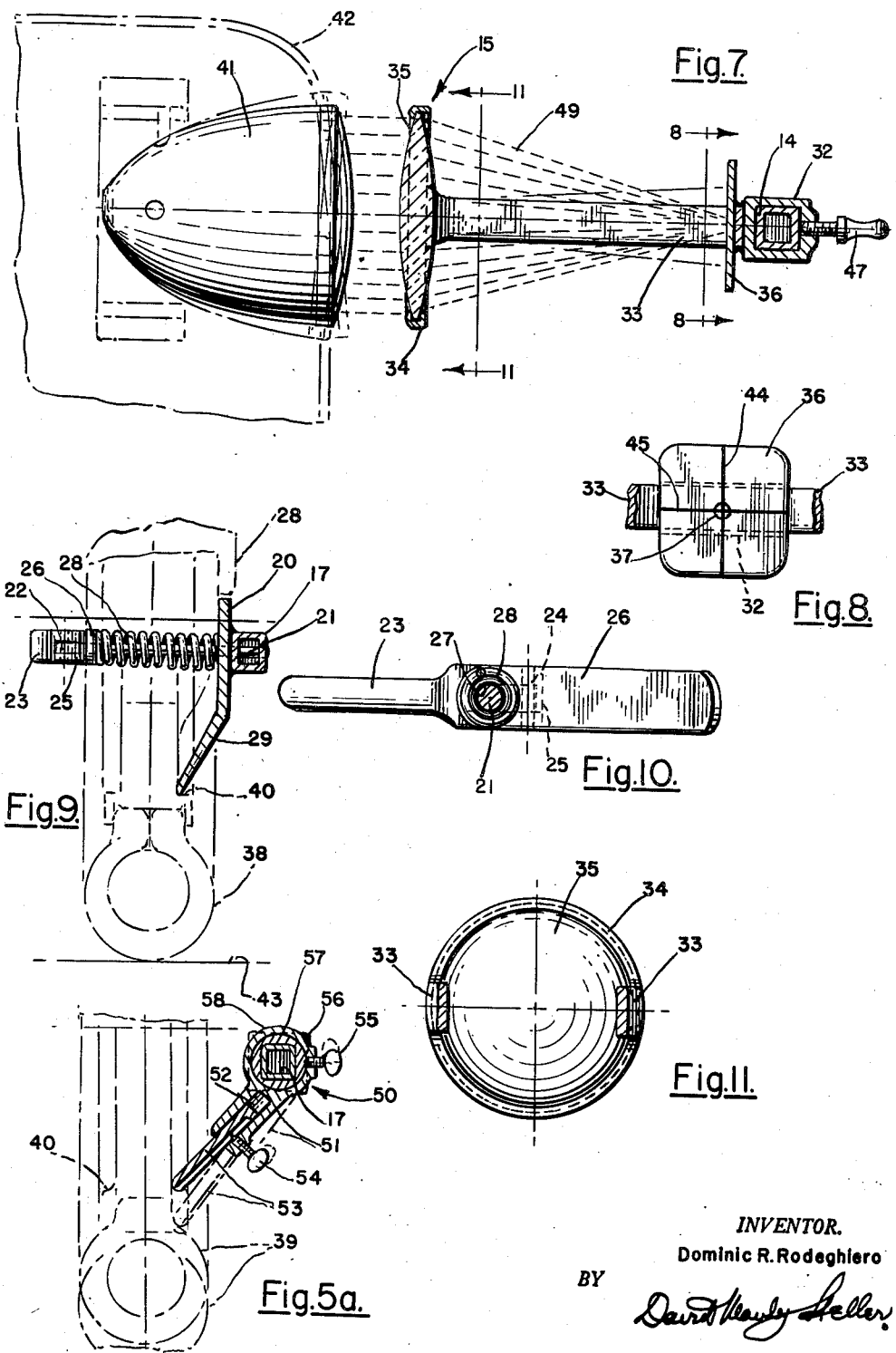

Patented May 8, 1951

2,552,116

UNITED STATES PATENT OFFICE 2,552,116

HEADLIGHT ADJUSTING MEANS OF THE TYPE THAT IS REMOVABLY ATTACHABLE TO A VEHICLE

Dominic R. Rodeghiero, Joliet, Ill.

Application June 27, 1949, Serial No. 101,594

10 Claims. (Cl. 88—14)

My invention relates to headlight adjusting means of the type that is removably attachable to a vehicle.

Present practices in the adjusting or focusing of vehicle headlights require elaborate paraphernalia which is independent of the vehicle and which requires level floors. In other words, the vehicle headlights can only be focused or adjusted in a room especially adapted for that purpose.

Therefore, it is a prime object of my invention to provide headlight adjusting means of the type that is removably attachable to a vehicle, wherein the aligning frame work of the said device is mounted in parallel relationship to the longitudinal horizontal center line of the vehicle, so that the said vehicle may have its headlights focused or adjusted at any place and the headlight adjusting may be accomplished even though the vehicle is not in an absolutely horizontal position.

A further important object of my invention is to provide headlight adjusting means of the above described character, having a framework that is attachable to one of the rear wheels of the vehicle and is maintained in horizontal alignment with the horizontal center line of the vehicle by means of gauging extensions to the rims of the front and rear vehicle wheels.

A still further object of my invention is to provide an adjustable light focusing unit to be used in connection with my invention, that may be adjusted in vertical and horizontal alignment with the headlights of the vehicle.

A further object of my invention is to provide headlight adjusting means of the above described character, that may quickly and easily be mounted in connection with a vehicle and may be easily removed therefrom, and which require a minimum of storage space when not in use.

A still further object of my invention is to provide headlight adjusting means of the type that is removably attachable to a vehicle, which is sturdily constructed and of simple design, to facilitate economical manufacture in quantity.

Other objects and advantages embraced in my invention will be disclosed in the following description and the accompanying illustrations, wherein like parts are designated by like numerals and in which;

Fig. 1 is a side view of my invention, shown attached to an automobile drawn in phantom lines.

Fig. 2 is an enlarged plan view of my invention taken looking in the direction of arrows 2—2 on Fig. 1, and showing the aligning means of the focusing units in relation to the vehicle headlamps.

Fig. 5A is a modification of the front wheel height gauging extension of my invention making it adaptable to vehicle wheels of different diameters.

Fig. 7 is an enlarged cross-sectional view of one of the light focusing units used in connection with my invention, and is taken substantially on line 7—7 on Fig. 2.

Fig. 8 is a detail of the light focusing unit partly in cross-section taken looking in the direction of arrows 8—8 on Fig. 7.

Fig. 9 is a detailed view, partly in cross-section, of the clamping assembly of my invention, taken substantially on line 9—9 on Fig. 1.

Fig. 10 is a detail of the clamping assembly of my invention, partly in cross-section, taken looking in the direction of line 10—10 on Fig. 4.

Fig. 11 is a detail of the light focusing unit partly in cross-section showing the lens thereof, taken looking in the direction of arrows 11—11 on Fig. 7.

Figure 3:
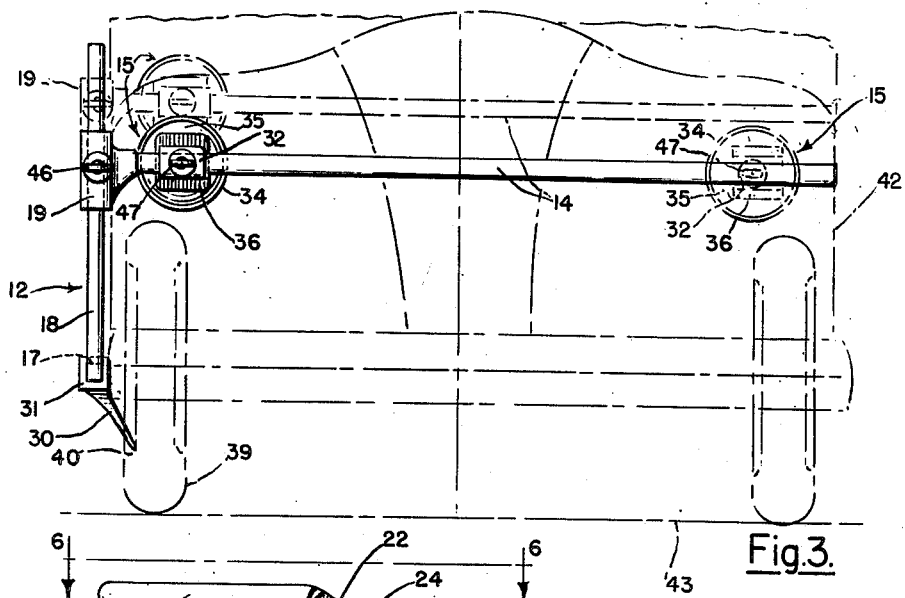
Fig. 3 is a front view of my invention taken looking in the direction of arrows 3—3 on Fig. 1, and showing the mounting of the adjustable light focusing support.

Referring to the illustrations, my invention is generally designated 12, and consists of aligning frame means 13, an adjustable light focusing support 14, light focusing unit 15 and a clamping assembly 16.

The said aligning frame means 13 consists of a horizontal frame portion 17 having a vertical frame portion 18 attached rigidly at its forward end.

A light focusing unit 15 is adjustably mounted upon vertical frame portion 18 by support frame adjusting bracket 19, and is held securely in place by set screw 46. The aligning frame means 13 and light focusing support 14 are preferably formed of square steel tubing to insure light weight and rigidity to the entire structure.

The aligning frame means 13 is attached to the rear wheel 38 of a vehicle 42 by means of the clamping assembly 16. The said clamping assembly 16 consists of a wheel engaging plate 20 which is fixedly mounted upon the rear end of horizontal frame portion 17 and is of a length to span a vehicle wheel at its greatest diameter. Clamp mounting rods 21 are rigidly mounted one in either end of wheel engaging plate 20 with the mounting head portion 22 extending past the inner edge of the wheel 38. A clamp handle 23 is articulately mounted by pivoting pin 24 on the bent mounting head portion 22 and has a locking cam portion 25 formed at right angles to the clamp handle 23 to engage wheel gripper plates 26, which are movably mounted by means of holes 27 over clamp mounting rods 21. The said wheel gripper plates 26 are maintained in extended position upon the clamp mounting rods 21 by compression springs 28 and may be angularly rotated as shown in Fig. 6 to permit the clamping assembly 16 to be mounted over the wheel 38 or removed therefrom.

Figure 4:
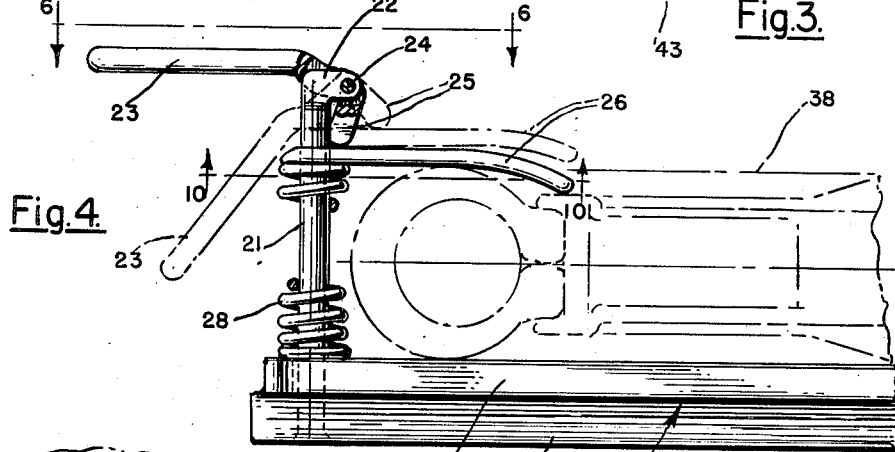
Fig. 4 is an enlarged fragmentary view of the clamping assembly used in connection with my invention, taken looking in the direction of arrows 4—4 on Fig. 1.

Fig. 4 illustrates the locking and unlocking positions of the clamping assembly in solid and phantom lines.

A height gauging extension 29 is formed on horizontal frame portion 17 in alignment with the horizontal center line of wheel engaging plate 20 and contacts the rim 40 of rear wheel 38 at the center line thereof. Height gauging extension 30 is formed on adjustable extension mounting bracket 31, which is adjustably mounted over horizontal frame portion 17 so that when adjusted, it will contact the rim 40 of front wheel 39 at the center line thereof. The height gauging extension 29 and 30 are equal in length to insure a parallel relationship between horizontal frame portion 17 and the horizontal center line 48 of vehicle 42.

Figures 5, 6:
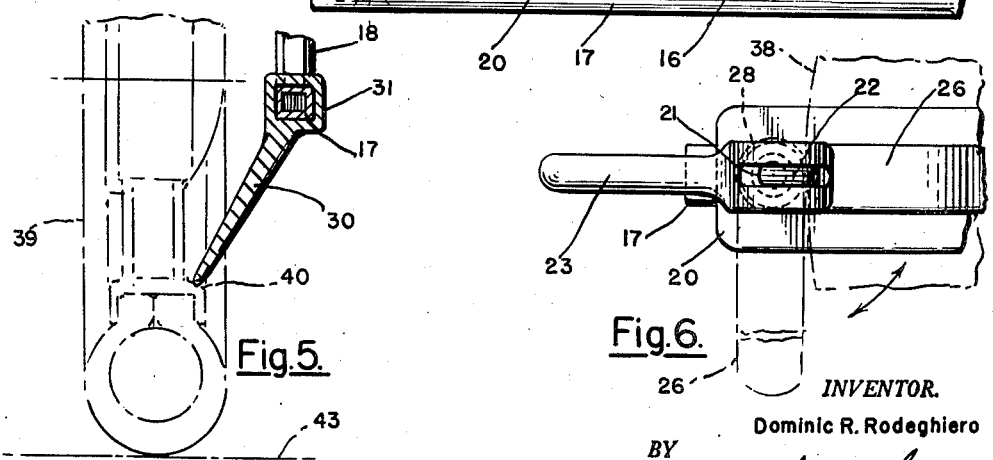
Fig. 5 is an enlarged cross-sectional view of the height gauging extension used in connection with the front wheel of the vehicle, and is taken substantially on line 5—5 on Fig. 1.
Fig. 6 is an enlarged fragmentary side view of a portion of the clamping assembly, taken looking in the direction of arrows 6—6 on Fig. 4.

Fig. 5A illustrates a modification to the adjustable height gauging extension shown in Fig. 5. The extensibly, retractably and angularly adjustable height gauging extension 50 consists of a rotatable collar 58 mounted in annular groove 57 in adjustable extension mounting bracket 56 and having a collar extension 51 with a blind bore 52 to hold an adjustable height gauging extension 53. A set screw 54 in collar extension 51 holds the adjustable height gauging extension 53 in extended or retracted adjustment. A set screw 55 maintains rotatable collar 58 in its adjusted position on adjustable extension mounting bracket 56. The hereinabove described modification permits my invention to be used in connection with vehicles wherein the front wheel axles are shorter than the rear wheel axles or where the wheels are of different diameters.

A light focusing unit 15 is mounted on light focusing support 14 by an adjustable focusing unit support 32 and is held in place thereon by set screw 47. The adjustable light focusing support 14 is adjusted vertically upon vertical frame portion 18 to bring light focusing units 15 into horizontal alignment with the headlight 41. The said light focusing unit 15 consists of a light focusing lens 35 within a lens rim 34, which is supported by lens supporting arms 33 attached to adjustable focusing unit support 32.

A focusing target 36 is mounted on the back of adjustable focusing unit support 32 in horizontal alignment with light focusing lens 35. The said focusing target 36 is inscribed with crossed horizontal and vertical target centering lines 44 and 45, locating a focusing center 37.

In using my invention, the vehicle does not require an absolutely level or horizontal floor 43 to rest upon, inasmuch as the horizontal center line 48 of the said vehicle 42 is used as the aligning factor in mounting the aligning frame means 13. This is accomplished by clamping the aligning frame means 13 to a rear wheel 38 so that height gauging extensions 29 and 30 mounted thereon will rest upon the lower portion of rims 40 of rear and front wheels 38 and 39, assuring that the said horizontal frame portion 17 will be in parallel alignment with the horizontal center line 48 of the vehicle 42.

The said aligning frame means 13 is rigidly secured to the vehicle 42 by clamping assembly 16 over rear wheel 38 so that when height gauging extensions 29 and 30 rest against center line rims 40 the said aligning frame means 13 will rigidly support the light focusing units 15 in horizontal alignment. The light focusing units 15 are horizontally and vertically aligned with headlights 41. The vehicle headlights 41 are turned on and the light beams, shown by dotted lines designated 49, will be focused by lens 35 to a point on focusing target 36. If the headlights 41 are in correct focus or alignment the focus point of light beam 49 will converge upon focal point center 37. If the headlights 41 are off-center or improperly focused, as shown by phantom lines in Figs. 2 and 7, the focused light beam 49 will strike focusing target 36 off-center. To focus the headlights 41, the said headlights 41 are adjusted horizontally and vertically until the focus beam 49 strikes focal center 37 of the focusing target 36. When both headlights are so adjusted, they will be in proper parallel alignment in relation to both the horizontal and vertical center lines of the vehicle 42.

A most important advantage residing in my invention is the horizontal parallel aligning means which insures that the horizontal frame portion 17, as shown in Figs. 1 and 2, will at all times be parallel with the horizontal center line 48 of the vehicle, established between front and rear wheels, regardless of the angle of the ground line 43. Using my invention, headlights may be focused and adjusted at any time or place, in a garage or on the road.

A further most important advantage in connection with my invention is the ease with which it is attached to and removed from the vehicle, having only one attaching point, the rear wheel thereof, and having only two resting or height gauging points, on the rims of the rear and front wheels.

A still further important advantage of my invention is the minimum of space it requires for storage when not in use, as contrasted with the cumbersome and space-taking paraphernalia required in the present practices of headlight focusing and adjusting.

Although my invention has been described, the terms used are to be deemed terms of description rather than terms of limitation, my intention being to retain the right to all mechanical equivalents of the structural elements depicted, provided they fall within the purview of the appended claims.

Having thus disclosed and revealed my invention, what I claim as new and desire to secure by Letters Patent is:

1. Headlight adjusting and focusing means comprising, aligning frame means provided with a vertical frame portion, clamping assembly means secured to one end of the said aligning frame means and adapted to secure the said aligning frame means to the wheel of a vehicle, adjustable light focusing support means slidably secured to the said vertical frame portion, light focusing means slidably secured to the said adjustable light focusing support means, the said clamping assembly means including wheel engaging plate means secured to the said aligning frame means, clamp mounting rod means secured rigidly to the said aligning frame means and provided with a mounting head portion, clamp handle means mounted in the said mounting head portion and provided with a cam portion, wheel gripper plate means secured to the said clamp mounting rod means intermediate its ends, and spring means mounted about the said clamp mounting rod means and confined between the said wheel engaging plate means and the said wheel gripper plate means urging the same to inoperative position when the said clamp handle means is in inoperative position.

2. Headlight adjusting and focusing means comprising, aligning frame means provided with a vertical frame portion, clamping assembly means secured to one end of the said aligning frame means and adapted to secure the said aligning frame means to the wheel of a vehicle, adjustable light focusing support means slidably secured to the said vertical frame portion, light focusing means slidably secured to the said adjustable light focusing support means, the said light focusing means being adjustable vertically by adjustment of the said adjustable light focusing support means on the said vertical frame portion, and also being adjustable horizontally by movement of the said light focusing means on the said adjustable light focusing support means, the said clamping assembly means including wheel engaging plate means secured to the said aligning frame means, clamp mounting rod means secured rigidly to the said aligning frame means and provided with a mounting head portion, clamp handle means mounted in the said mounting head portion and provided with a cam portion, wheel gripper plate means secured to the said clamp mounting rod means intermediate its ends, and spring means mounted about the said clamp mounting rod means and confined between the said wheel engaging plate means and the said wheel gripper plate means urging the same to inoperative position when the said clamp handle means is in inoperative position.

3. Headlight adjusting and focusing means comprising, aligning frame means provided with a vertical frame portion, clamping assembly means secured to one end of the said aligning frame means and adapted to secure the said aligning frame means to the wheel of a vehicle, adjustable light focusing support means slidably secured to the said vertical frame portion, light focusing means slidably secured to the said adjustable light focusing support means, rear wheel height gauging extension means secured to the said aligning frame means and adapted to rest on the rim portion of the rear wheel of a vehicle at the vertical axis thereof, front wheel height gauging means slidably secured to the said aligning frame means and adapted to rest on the rim portion of the front wheel of a vehicle and at the vertical axis thereof in order to produce alignment of the said aligning frame means and the center line of the said front and rear wheels, the said clamping assembly means including wheel engaging plate means secured to the said aligning frame means, clamp mounting rod means secured rigidly to the said aligning frame means and provided with a mounting head portion, clamp handle means mounted in the said mounting head portion and provided with a cam portion, wheel gripper plate means secured to the said clamp mounting rod means intermediate its ends, and spring means mounted about the said clamp mounting rod means and confined between the said wheel engaging plate means and the said wheel gripper plate means urging the same to inoperative position when the said clamp handle means is in inoperative position.

4. Headlight adjusting and focusing means comprising, aligning frame means provided with a vertical frame portion, clamping assembly means secured to one end of the said aligning frame means and adapted to secure the said aligning frame means to the wheel of a vehicle, adjustable light focusing support means slidably secured to the said vertical frame portion, light focusing means slidably secured to the said adjustable light focusing support means, the said light focusing means being adjustable vertically by adjustment of the said adjustable light focusing support means on the said vertical frame portion, and also being adjustable horizontally by movement of the said light focusing means on the said adjustable light focusing support means, rear wheel height gauging extension means secured to the said aligning frame means and adapted to rest on the rim portion of the rear wheel of a vehicle at the vertical axis thereof, front wheel height gauging means slidably secured to the said aligning frame means and adapted to rest on the rim portion of the front wheel of a vehicle and at the vertical axis thereof in order to produce alignment of the said aligning frame means and the center line of the said front and rear wheels, the said clamping assembly means including wheel engaging plate means secured to the said aligning frame means, clamp mounting rod means secured rigidly to the said aligning frame means and provided with a mounting head portion, clamp handle means mounted in the said mounting head portion and provided with a cam portion, wheel gripper plate means secured to the said clamp mounting rod means intermediate its ends, and spring means mounted about the said clamp mounting rod means and confined between the said wheel engaging plate means and the said wheel gripper plate means urging the same to inoperative position when the said clamp handle means is in inoperative position.

5. Headlight adjusting and focusing means comprising, aligning frame means provided with a vertical frame portion, clamping assembly means secured to one end of the said aligning frame means and adapted to secure the said aligning frame means to the wheel of a vehicle, adjustable light focusing support means slidably secured to the said vertical frame portion, light focusing means slidably secured to the said adjustable light focusing support means, the said clamping assembly means including wheel engaging plate means secured to the said aligning frame means, clamp mounting rod means secured rigidly to the said aligning frame means and provided with a mounting head portion, clamp handle means mounted in the said mounting head portion and provided with a cam portion, wheel gripper plate means secured to the said clamp mounting rod means intermediate its ends, spring means mounted about the said clamp mounting rod means and confined between the said wheel engaging plate means and the said wheel gripper plate means urging the same to inoperative position when the said clamp handle means is in inoperative position, the said light focusing means including, adjustable focusing unit support means, lens supporting arms extending from the said focusing unit support means, focusing lens means mounted on the said lens supporting arms, and focusing target means secured to the said focusing unit support means within focusing distance from the said focusing lens.

6. Headlight adjusting and focusing means comprising, aligning frame means provided with a vertical frame portion, clamping assembly means secured to one end of the said aligning frame means and adapted to secure the said aligning frame means to the wheel of a vehicle, adjustable light focusing support means slidably secured to the said vertical frame portion, light focusing means slidably secured to the said adjustable light focusing support means, the said light focusing means being adjustable vertically by adjustment of the said adjustable light focusing support means on the said vertical frame portion, and also being adjustable horizontally by movement of the said light focusing means on the said adjustable light focusing support means, the said clamping assembly means including wheel engaging plate means secured to the said aligning frame means, clamp mounting rod means secured rigidly to the said aligning frame means and provided with a mounting head portion, clamp handle means mounted in the said mounting head portion and provided with a cam portion, wheel gripper plate means secured to the said clamp mounting rod means intermediate its ends, spring means mounted about the said clamp mounting rod means and confined between the said wheel engaging plate means and the said wheel gripper plate means urging the same to inoperative position when the said clamp handle means is in inoperative position, the said light focusing means including, adjustable focusing unit support means, lens supporting arms extending from the said focusing unit support means, focusing lens means mounted on the said lens supporting arms, and focusing target means secured to the said focusing unit support means within focusing distance from the said focusing lens.

7. Headlight adjusting and focusing means comprising, aligning frame means provided with a vertical frame portion, clamping assembly means secured to one end of the said aligning frame means and adapted to secure the said aligning frame means to the wheel of a vehicle, adjustable light focusing support means slidably secured to the said vertical frame portion, light focusing means slidably secured to the said adjustable light focusing support means, rear wheel height gauging extension means secured to the said aligning frame means and adapted to rest on the rim portion of the rear wheel of a vehicle at the vertical axis thereof, front wheel height gauging means slidably secured to the said aligning frame means and adapted to rest on the rim portion of the front wheel of a vehicle and at the vertical axis thereof in order to produce alignment of the said aligning frame means and the center line of the said front and rear wheels, the said clamping assembly means including wheel engaging plate means secured to the said aligning frame means, clamp mounting rod means secured rigidly to the said aligning frame means and provided with a mounting head portion, clamp handle means mounted in the said mounting head portion and provided with a cam portion, wheel gripper plate means secured to the said clamp mounting rod means intermediate its ends, spring means mounted about the said clamp mounting rod means and confined between the said wheel engaging plate means and the said wheel gripper plate means urging the same to inoperative position when the said clamp handle means is in inoperative position, the said light focusing means including, adjustable focusing unit support means, lens supporting arms extending from the said focusing unit support means, focusing lens means mounted on the said lens supporting arms, and focusing target means secured to the said focusing unit support means within focusing distance from the said focusing lens.

8. Headlight adjusting and focusing means comprising, aligning frame means provided with a vertical frame portion, clamping assembly means secured to one end of the said aligning frame means and adapted to secure the said aligning frame means to the wheel of a vehicle, adjustable light focusing support means slidably secured to the said vertical frame portion, light focusing means slidably secured to the said adjustable light focusing support means, the said light focusing means being adjustable vertically by adjustment of the said adjustable light focusing support means on the said vertical frame portion, and also being adjustable horizontally by movement of the said light focusing means on the said adjustable light focusing support means, rear wheel height gauging extension means secured to the said aligning frame means and adapted to rest on the rim portion of the rear wheel of a vehicle at the vertical axis thereof, front wheel height gauging means slidably secured to the said aligning frame means and adapted to rest on the rim portion of the front wheel of a vehicle and at the vertical axis thereof in order to produce alignment of the said aligning frame means and the center line of the said front and rear wheels, the said clamping assembly means including wheel engaging plate means secured to the said aligning frame means, clamp mounting rod means secured rigidly to the said aligning frame means and provided with a mounting head portion, clamp handle means mounted in the said mounting head portion and provided with a cam portion, wheel gripper plate means secured to the said clamp mounting rod means intermediate its ends, spring means mounted about the said clamp mounting rod means and confined between the said wheel engaging plate means and the said wheel gripper plate means urging the same to inoperative position when the said clamp handle means is in inoperative position, the said light focusing means including, adjustable focusing unit support means, lens supporting arms extending from the said focusing unit support means, focusing lens means mounted on the said lens supporting arms, and focusing target means secured to the said focusing unit support means within focusing distance from the said focusing lens.

9. Headlight adjusting and focusing means comprising, aligning frame means provided with a vertical frame portion, clamping assembly means secured to one end of the said aligning frame means and adapted to secure the said aligning frame means to the wheel of a vehicle, adjustable light focusing support means slidably secured to the said vertical frame portion, light focusing means slidably secured to the said adjustable light focusing support means, rear wheel height gauging extension means secured to the said aligning frame means and adapted to rest on the rim portion of the rear wheel of a vehicle at the vertical axis thereof, and front wheel height gauging means slidably secured to the said aligning frame means and adapted to rest on the rim portion of the front wheel of a vehicle and at the vertical axis thereof in order to produce alignment of the said aligning frame means and the center line of the said front and rear wheels, the said front wheel height gauging means having height gauging extension means provided with angularly adjustable means and further provided with extensible and retractable means to vary the length thereof.

10. Headlight adjusting and focusing means comprising, aligning frame means provided with a vertical frame portion, clamping assembly means secured to one end of the said aligning frame means and adapted to secure the said aligning frame means to the wheel of a vehicle, adjustable light focusing support means slidably secured to the said vertical frame portion, light focusing means slidably secured to the said adjustable light focusing support means, the said light focusing means being adjustable vertically by adjustment of the said adjustable light focusing support means on the said vertical frame portion, and also being adjustable horizontally by movement of the said light focusing means on the said adjustable light focusing support means, rear wheel height gauging extension means secured to the said aligning frame means and adapted to rest on the rim portion of the rear wheel of a vehicle at the vertical axis thereof, and front wheel height gauging means slidably secured to the said aligning frame means and adapted to rest on the rim portion of the front wheel of a vehicle and at the vertical axis thereof in order to produce alignment of the said aligning frame means and the center line of the said front and rear wheels, the said front wheel height gauging means having height gauging extension means provided with angularly adjustable means and further provided with extensible and retractable means to vary the length thereof.

DOMINIC R. RODEGHIERO.

REFERENCES CITED

The following references are of record in the file of this patent:

UNITED STATES PATENTS

| Number | Name | Date |
| --- | --- | --- |
| 2,176,215 | Falge | Oct. 17, 1939 |
| 2,314,559 | Schilling | Mar. 23, 1943 |
| 2,475,502 | Holmes | July 5, 1949 |